(12) United States Patent
Zhou et al.

(10) Patent No.: US 12,434,752 B2
(45) Date of Patent: Oct. 7, 2025

(54) FOLDING TROLLEY

(71) Applicants: Yongshuai Zhou, Jinhua (CN); Gang Shi, Shanghai (CN)

(72) Inventors: Yongshuai Zhou, Jinhua (CN); Gang Shi, Shanghai (CN)

( * ) Notice: Subject to any disclaimer, the term of this patent is extended or adjusted under 35 U.S.C. 154(b) by 309 days.

(21) Appl. No.: 17/934,270

(22) Filed: Sep. 22, 2022

(65) Prior Publication Data

US 2023/0094718 A1    Mar. 30, 2023

(30) Foreign Application Priority Data

Sep. 23, 2021 (CN) .......................... 202122303327.4

(51) Int. Cl.
  B62B 3/02    (2006.01)

(52) U.S. Cl.
  CPC .................................. B62B 3/025 (2013.01)

(58) Field of Classification Search
  CPC ..... B62B 3/025; B62B 2205/06; B62B 5/067; B62B 3/007; Y02T 10/70
  See application file for complete search history.

(56) References Cited

U.S. PATENT DOCUMENTS

| | | | | |
|---|---|---|---|---|
| 8,011,686 | B2* | 9/2011 | Chen | B62B 3/106 280/87.01 |
| 9,056,621 | B1* | 6/2015 | Jin | B62B 3/027 |
| 10,099,711 | B1* | 10/2018 | Sun | B62B 3/007 |
| 10,836,418 | B2* | 11/2020 | Zhu | B62B 3/025 |
| 10,953,903 | B1* | 3/2021 | Park | B62B 3/007 |
| 11,225,277 | B1* | 1/2022 | Sun | B62B 5/061 |
| 11,370,467 | B1* | 6/2022 | Horowitz | B62B 3/007 |
| 11,577,766 | B2* | 2/2023 | Horowitz | B62B 5/065 |
| 11,932,298 | B2* | 3/2024 | Sun | B62B 3/007 |
| 12,012,139 | B2* | 6/2024 | Sun | B62B 3/007 |
| 2010/0090444 | A1* | 4/2010 | Chen | B62B 3/106 280/651 |
| 2015/0151771 | A1* | 6/2015 | Jin | B62B 5/0013 280/651 |
| 2018/0327011 | A1* | 11/2018 | Horowitz | B62B 3/025 |
| 2020/0189638 | A1* | 6/2020 | Zhu | B62B 5/067 |

(Continued)

FOREIGN PATENT DOCUMENTS

CN       103895672 A  *  7/2014   ............. B62B 3/007

*Primary Examiner* — James A Shriver, II
*Assistant Examiner* — Ian Bryce Shelton
(74) *Attorney, Agent, or Firm* — McDonnell Boehnen Hulbert & Berghoff LLP (57) ABSTRACT

The present invention provides a folding trolley, which includes a bottom frame folding and unfolding assembly, a front wheel assembly and a rear wheel assembly. Side frame folding and unfolding assemblies are provided on both sides of the bottom frame folding and unfolding assembly, the bottom frame folding and unfolding assembly can be unfolded or folded through the side frame folding and unfolding assembly; one end of the side frame folding and unfolding assembly is connected with the front wheel assembly, the middle part of the side frame folding and unfolding assembly is connected with the bottom frame folding and unfolding assembly, and the other end of the side frame folding and unfolding assembly is connected with the rear wheel assembly. The invention provides a folding trolley, which overcomes the defects of an existing trolley with low load bearing capacity and poor functionality.

5 Claims, 7 Drawing Sheets

(56) References Cited

U.S. PATENT DOCUMENTS

| | | | |
|---|---|---|---|
| 2021/0107549 A1* | 4/2021 | Wang | B62B 3/007 |
| 2021/0114643 A1* | 4/2021 | Sun | B62B 3/02 |
| 2021/0284216 A1* | 9/2021 | Sun | B62B 3/02 |
| 2022/0340183 A1* | 10/2022 | Sun | B62B 3/025 |
| 2023/0001973 A1* | 1/2023 | Frankel | B62B 3/003 |

* cited by examiner

FOLDING TROLLEY

CROSS-REFERENCE TO RELATED APPLICATIONS

This application claims priority to Chinese Patent Application No. 202122303327.4, filed on Sep. 23, 2021, which is incorporated by reference herein in its entirety.

TECHNICAL FIELD

The present invention relates to the field of folding trolleys, in particular to a folding trolley.

BACKGROUND ART

With the improvement of living standards, more and more people like self-driving for outdoor activities. At the same time, a lot of picnic food and outdoor equipment will be carried when self-driving. However, the car for self-driving can only be driven to the parking place, and people need to walk to complete most of the remaining distance. It is very inconvenient for people to carry so many things on foot outdoors. Now, trolleys that can be folded and placed in the trunk are also being sold on the market. When in use, the trolley can be opened to carry picnic food and outdoor appliances, which is convenient for people to carry.

Existing trolleys mostly use translationally foldable trolleys. Although the structure is simple, the trolleys with this structure are longer after folding, so they still occupy a lot of space during storage, which is inconvenient to carry; and the trolleys with this structure have limited load bearing capacity, no sunshade shed and poor functionality.

SUMMARY OF THE INVENTION

(I) Technical Problem to be Solved

The problem to be solved by the present invention is to provide a folding trolley, so as to overcome the defects of an existing trolley with low load bearing capacity and poor functionality.

(II) Technical Solution

In order to solve the technical problem, the present invention provides a folding trolley, which includes a bottom frame folding and unfolding assembly and a front wheel assembly and a rear wheel assembly respectively installed at the front and rear ends of the bottom frame folding and unfolding assembly. Side frame folding and unfolding assemblies are provided on both sides of the bottom frame folding and unfolding assembly, the bottom frame folding and unfolding assembly can be unfolded or folded through the side frame folding and unfolding assembly; and one end of the side frame folding and unfolding assembly is connected with the front wheel assembly, the middle part of the side frame folding and unfolding assembly is connected with the bottom frame folding and unfolding assembly, and the other end of the side frame folding and unfolding assembly is connected with the rear wheel assembly. The folding trolley has the characteristics of high load bearing capacity, small volume after folding, and liftable canopy, and has good practicability and promotion value.

Further, the bottom frame folding and unfolding assembly includes a first X-shaped frame and a second X-shaped frame, the first X-shaped frame and the second X-shaped frame are hinged to each other through first hinged seats on both sides; and one end of the first X-shaped frame is hinged with the front wheel assembly, and one end of the second X-shaped frame is hinged with the rear wheel assembly. The first X-shaped frame and the second X-shaped frame have the same structure, each include a second hinged seat in the middle part and four supporting rods hinged to the second hinged seat, and two adjacent hinged rods are vertically provided.

Further, the side frame folding and unfolding assembly includes a first folding rod and a second folding rod hinged with the first hinged seat respectively, one end of the first folding rod is connected with the front wheel assembly, and one end of the second folding rod is connected with the rear wheel assembly. The side frame folding and unfolding assembly further includes a third folding rod and a fourth folding rod whose end portions are hinged to each other, one end of the third folding rod is hinged with the front wheel assembly, and the middle part of the third folding rod is hinged with the first folding rod; and one end of the fourth folding rod is hinged with the rear wheel assembly, and the middle part of the fourth folding rod is hinged with the second folding rod.

Further, the front wheel assembly and the rear wheel assembly have the same structure, each include telescopic rods provided symmetrically and a third X-shaped frame installed between the two telescopic rods, a third hinged seat is slidably installed on the telescopic rod, and both sides of the upper end of the third X-shaped frame are respectively hinged with the third hinged seat, and one end of the first folding rod or the second folding rod is hinged to the third hinged seat. A fourth hinged seat is fixed at the lower end of the telescopic rod, and casters are detachably installed on the fourth hinged seat; and both sides of the lower end of the third X-shaped frame are hinged with the fourth hinged seat respectively, and one end of the third folding rod or the fourth folding rod is hinged to the fourth hinged seat.

Further, a sunshade shed is installed between the four telescopic rods, and the sunshade shed can be raised and lowered under the driving of the telescopic rods. A push rod assembly for pushing a trolley body is installed on the rear side of the rear wheel assembly.

Further, the push rod assembly includes a fifth hinged seat located between the two telescopic rods, and both sides of the fifth hinged seat are connected to the telescopic rod through the fifth folding rod respectively, the upper side of the fifth hinge seat is hinged with a push handle, and the middle part of the third X-shaped frame is provided with a clamping ring for clamping the push handle.

(III) Beneficial Effects

The present invention provides the folding trolley, the bottom frame folding and unfolding assembly includes two X-shaped frames, which effectively increases the load bearing area and capacity: the side frame folding and unfolding assemblies are respectively connected with the front wheel assembly, the bottom frame folding and unfolding assembly and the rear wheel assembly, which effectively increases the support strength, improves the load bearing capacity of the trolley body, and prolongs the service life: the bottom frame folding and unfolding assembly can be folded or unfolded along with the side frame folding and unfolding assembly, which is easy to fold, and after folding, the overall volume is small and the storage is easy: the sunshade shed that can be raised and lowered is provided, which can protect articles from rain, increase the functions of the trolley, and has high practicability; the casters can be detached, which is convenient to detach and install and is conducive to reducing the storage space; and the folding trolley overcomes the defects of the existing trolley with low load bearing capacity and poor functionality.

List of numerals: 1. bottom frame folding and unfolding assembly: 2. front wheel assembly: 3. rear wheel assembly: 4. side frame folding and unfolding assembly: 5. sunshade shed: 6. push rod assembly: 11. first X-shaped frame: 12. second X-shaped frame: 13. first hinged seat, 14. second hinged seat, 15. supporting rod: 21. telescopic rod: 22. third X-shaped frame: 23. third hinged frame: 24. fourth hinged seat: 25. caster: 41. first folding rod: 42. second folding rod: 43. third folding rod: 44. fourth folding rod: 61. fifth hinged seat: 62. fifth folding rod: 63. push handle; and 64. clamping ring.

DETAILED DESCRIPTION OF THE INVENTION

The specific implementations of the present invention will be described in further detail below with reference to the accompanying drawings and embodiments. The following embodiments are used to illustrate the present invention, but are not intended to limit the scope of the present invention.

Referring to FIGS. 1-7, the present invention provides a folding trolley, which includes a bottom frame folding and unfolding assembly 1, and a front wheel assembly 2 and a rear wheel assembly 3 respectively installed at the front and rear ends of the bottom frame folding and unfolding assembly 1. Both sides of the bottom frame folding and unfolding assembly 1 are provided with a side frame folding and unfolding assembly 4, and the bottom frame folding and unfolding assembly 1 can be unfolded or folded through the side frame folding and unfolding assembly 4. One end of the side frame folding and unfolding assembly 4 is connected with the front wheel assembly 2, and the middle part of the side frame folding and unfolding assembly is connected to the bottom frame folding and unfolding assembly 1, and the other end of the side frame folding and unfolding assembly is connected with the rear wheel assembly 3.

Figure 1:
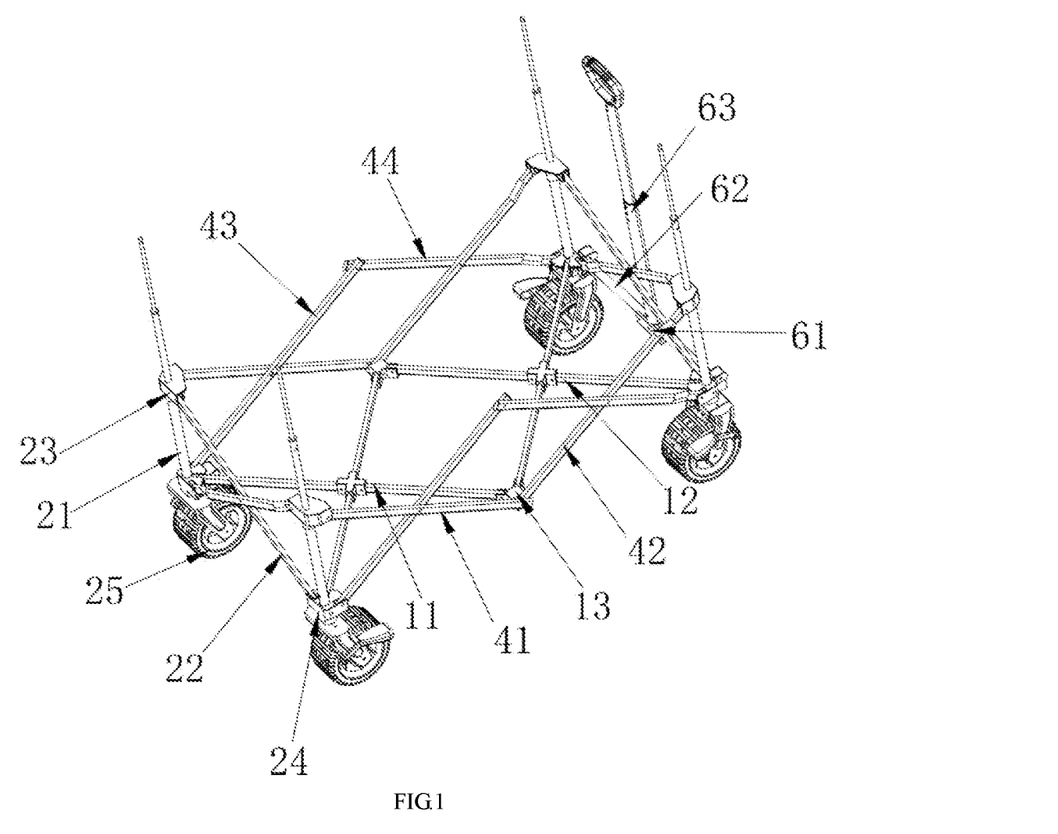
FIG. 1 is a perspective view of a folding trolley of the present invention.
Figure 3:
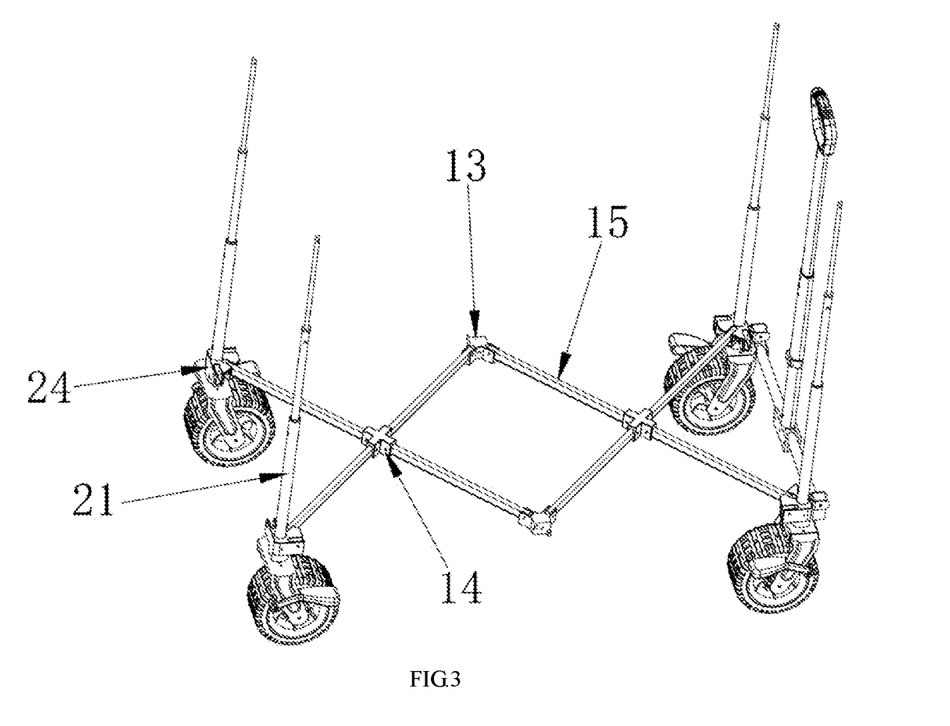
FIG. 3 is a perspective view of the folding trolley of the present invention after removing a side frame folding and unfolding assembly.

Referring to FIG. 1 and FIG. 3, the bottom frame folding and unfolding assembly 1 includes a first X-shaped frame 11 and a second X-shaped frame 12. The first X-shaped frame 11 and the second X-shaped frame 12 are hinged to each other through first hinged seats 13 on both sides. One end of the first X-shaped frame 11 is hinged with the front wheel assembly 2, and one end of the second X-shaped frame 12 is hinged with the rear wheel assembly 3. The first X-shaped frame 11 and the second X-shaped frame 12 have the same structure, each include a second hinged seat 14 in the middle part and four supporting rods 15 hinged to the second hinged seat 14, and two adjacent hinged rods 15 are vertically provided. The supporting rod 15 can rotate downward relative to the second hinged seat 14, and the supporting rod 15 can rotate upward relative to the first hinged seat 13.

Figure 4:
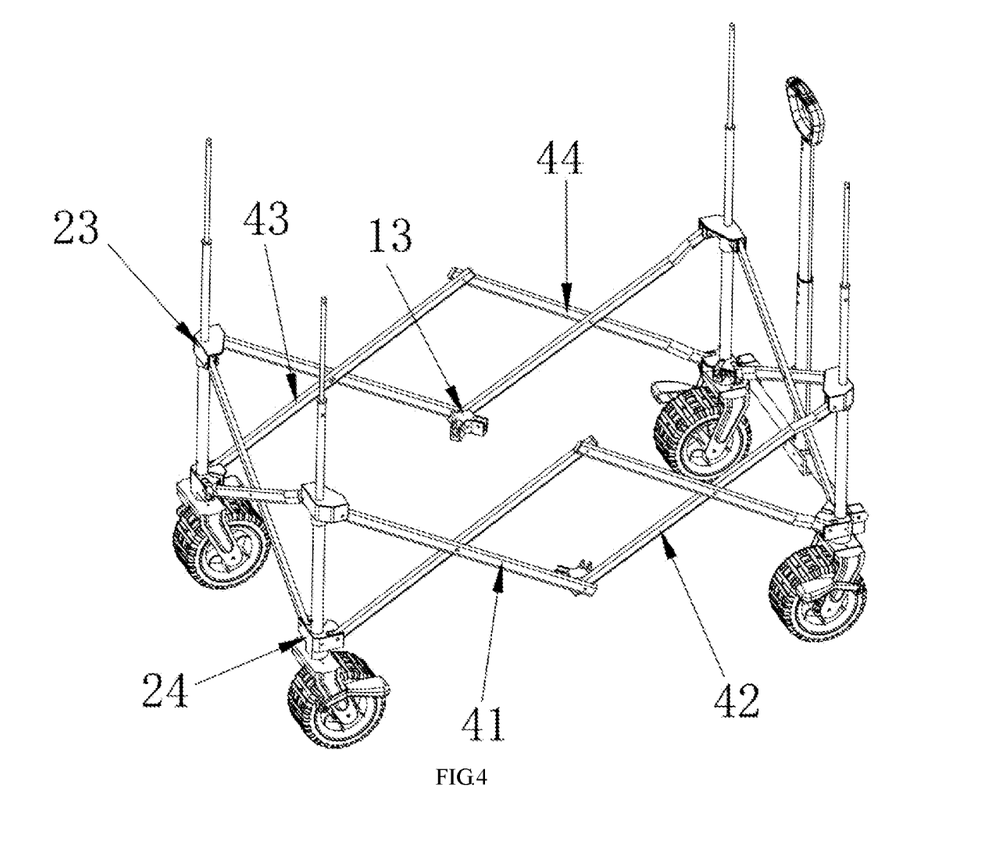
FIG. 4 is a perspective view of the folding trolley of the present invention after removing a bottom frame folding and unfolding assembly.

Referring to FIG. 1 and FIG. 4, the side frame folding and unfolding assembly 4 includes a first folding rod 41 and a second folding rod 42 hinged with the first hinged seat 13 respectively, and a third folding rod 43 and a fourth folding rod 44 whose end portions are hinged to each other, one end of the first folding rod 41 is connected with the front wheel assembly 2, and one end of the second folding rod 42 is connected with the rear wheel assembly 3. One end of the third folding rod 43 is hinged with the front wheel assembly 2, and the middle part of the third folding rod is hinged with the first folding rod 41. One end of the fourth folding rod 44 is hinged with the rear wheel assembly 3, and the middle part of the fourth folding rod is hinged with the second folding rod 42.

Figure 5:
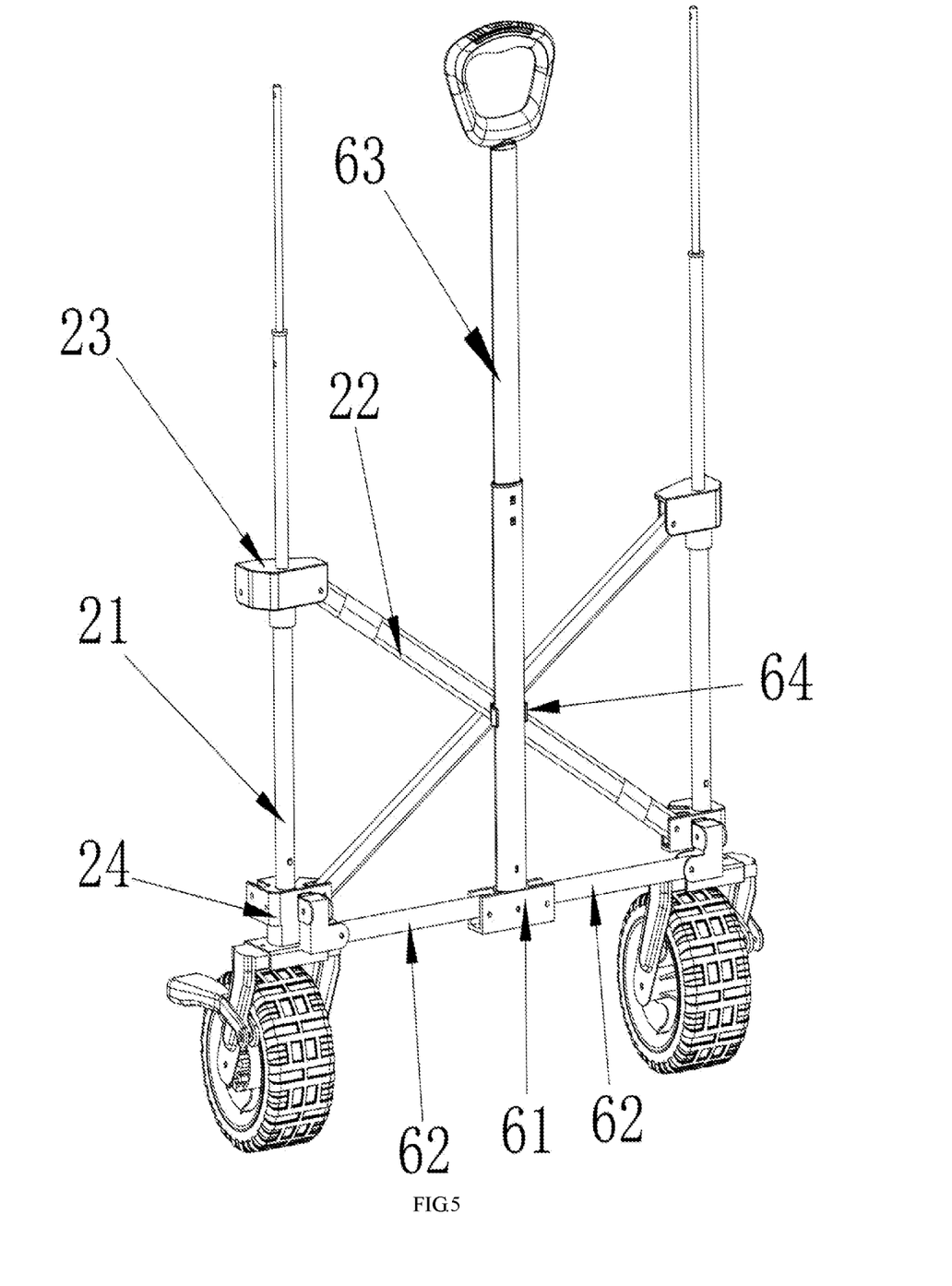
FIG. 5 is a perspective view of connection between a rear wheel assembly and a push rod assembly of the folding trolley of the present invention.
Figure 6:
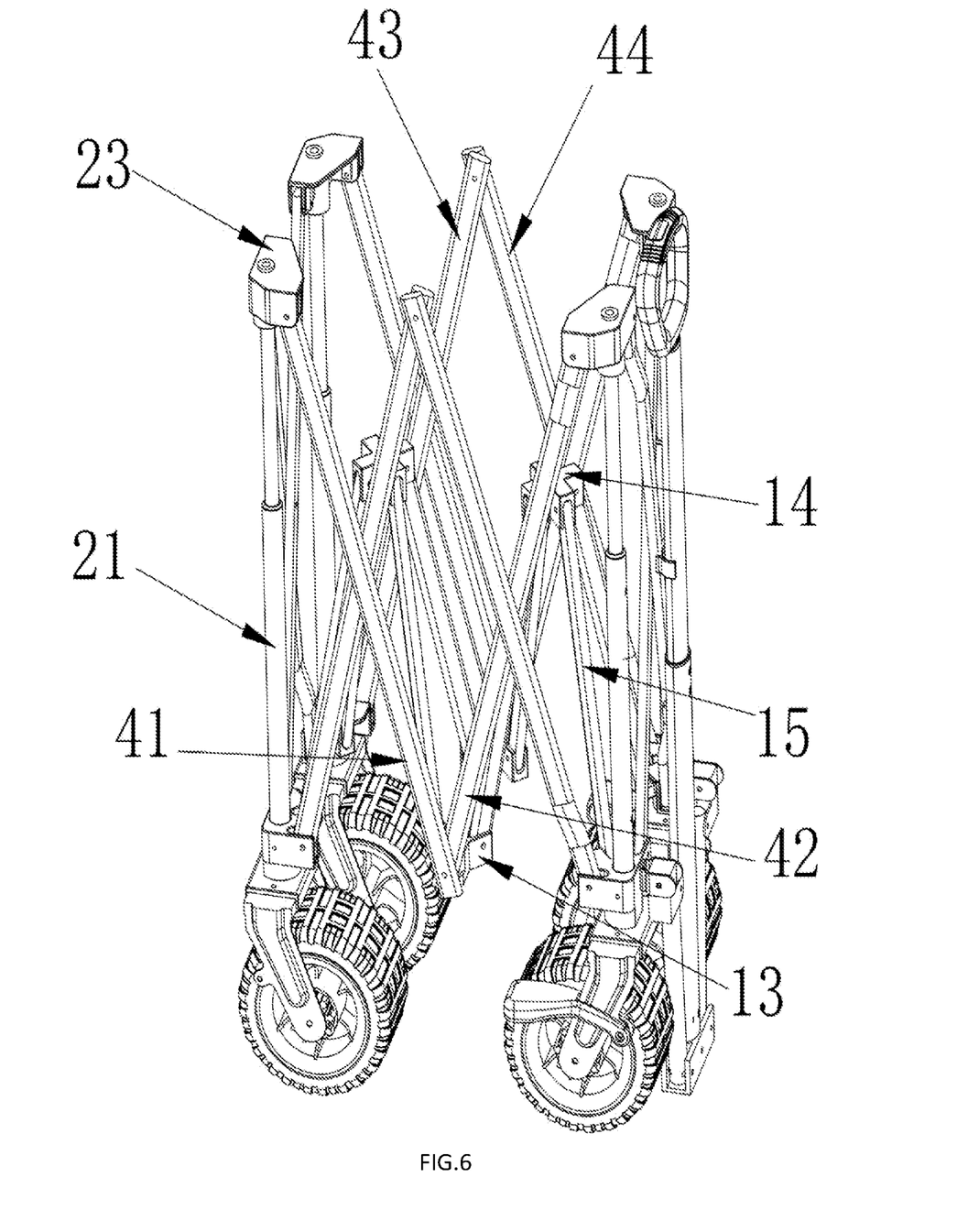
FIG. 6 is a perspective view of the folding trolley of the present invention after folding.
Figure 7:
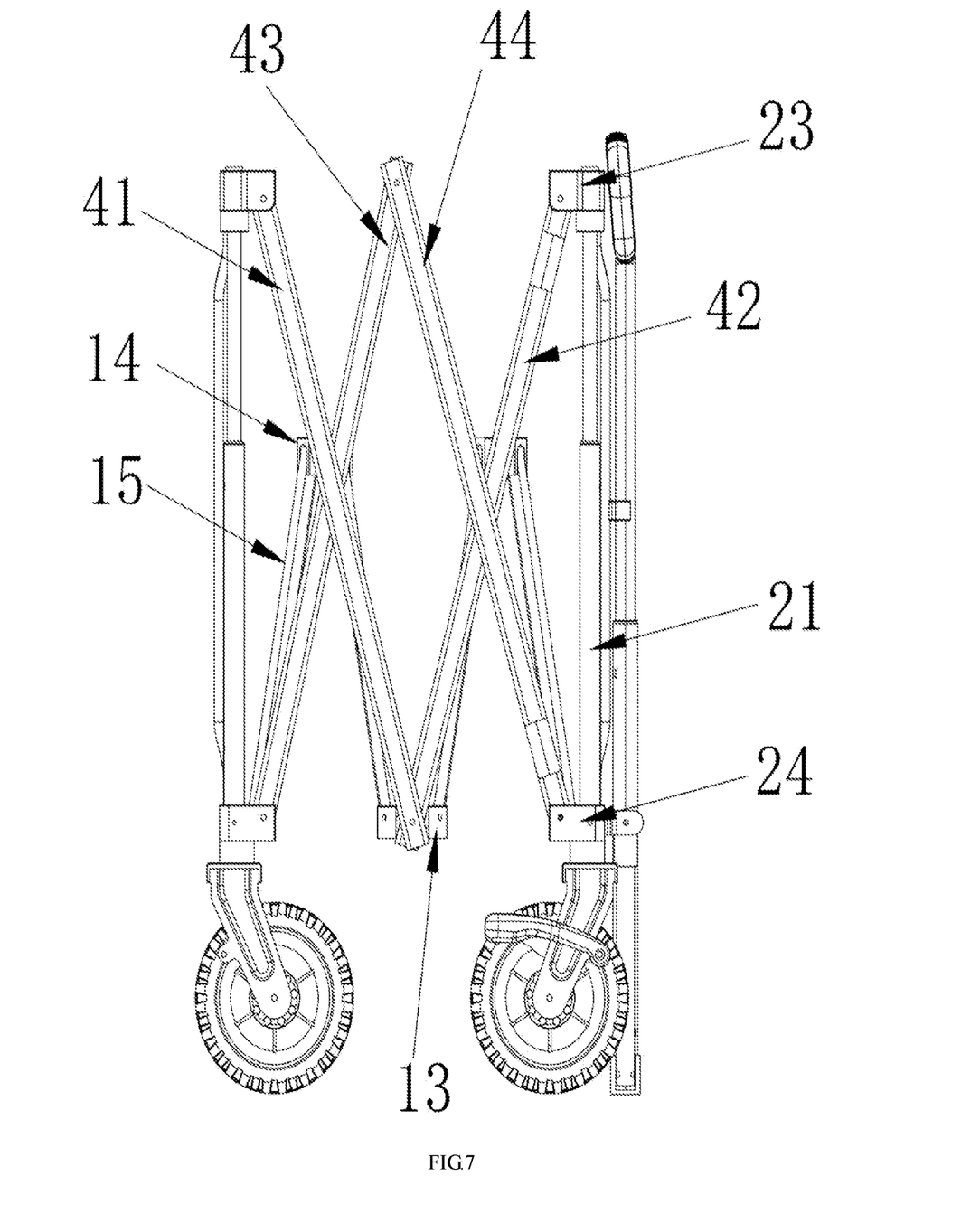
FIG. 7 is a schematic structural diagram of the folding trolley of the present invention after folding.

Referring to FIG. 1 and FIG. 5, the front wheel assembly 2 and the rear wheel assembly 3 have the same structure, each include telescopic rods 21 provided symmetrically and a third X-shaped frame 22 installed between the two telescopic rods 21, and the third X-frame 22 includes two folding rods hinged to each other in the middle parts. A third hinged seat 23 is slidably installed on the telescopic rod 21, and both sides of the upper end of the third X-shaped frame 22 are respectively hinged with the third hinged seat 23. One end of the first folding rod 41 or the second folding rod 42 is hinged to the third hinged seat 23. A fourth hinged seat 24 is fixed at the lower end of the telescopic rod 21, and casters 25 are detachably installed on the fourth hinged seat 24. Both sides of the lower end of the third X-shaped frame 22 are hinged with the fourth hinged seat 24 respectively, and one end of the third folding rod 43 or the fourth folding rod 44 is hinged to the fourth hinged seat 24.

Figure 2:
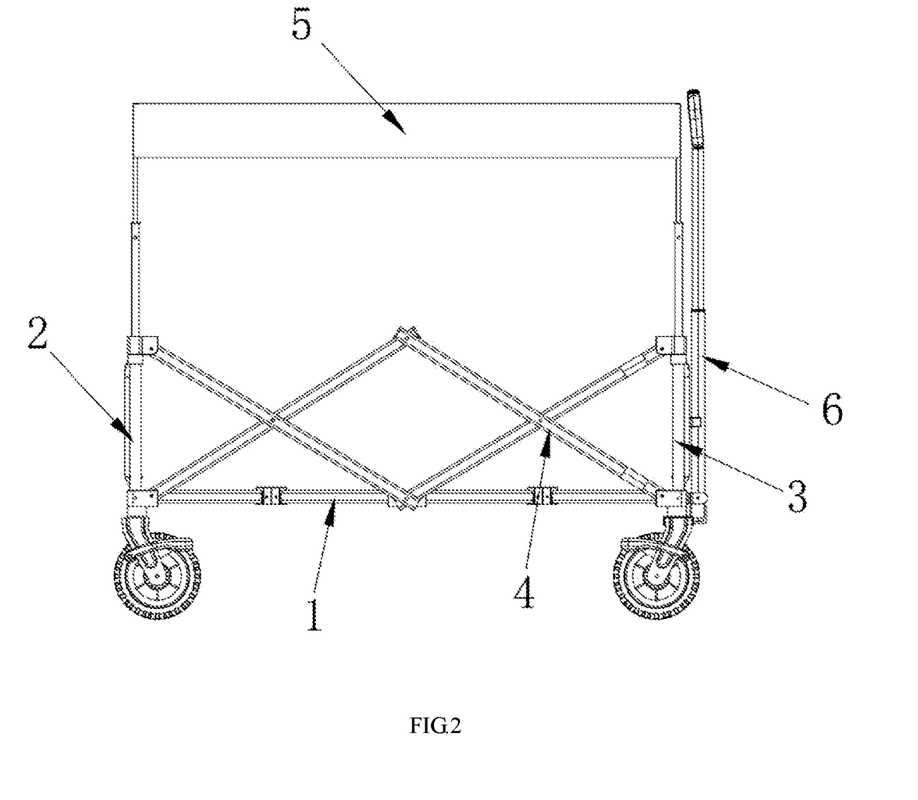
FIG. 2 is a schematic structural diagram of the folding trolley of the present invention.

Referring to FIG. 1 and FIG. 2, a sunshade shed 5 is installed between the four telescopic rods 21, and the sunshade shed 5 can be raised and lowered under the driving of the telescopic rods 21. A push rod assembly 6 for pushing a trolley body is installed on the rear side of the rear wheel assembly 3.

Referring to FIG. 1 and FIG. 5, the push rod assembly 6 includes a fifth hinged seat 61 located between the two telescopic rods 21, and both sides of the fifth hinged seat 61 are connected to the telescopic rod 21 through the fifth folding rod 62 respectively. The upper side of the fifth hinge seat 61 is hinged with a push handle 63, and the middle part of the third X-shaped frame 22 is provided with a clamping ring 64 for clamping the push handle 63.

The folding trolley provided by this embodiment is simple in structure and low in manufacturing cost: the bottom frame folding and unfolding assembly includes two X-shaped frames, which effectively increases the load bearing area and capacity: the side frame folding and unfolding assemblies are respectively connected with the front wheel assembly, the bottom frame folding and unfolding assembly and the rear wheel assembly, which effectively increases the support strength, improves the load bearing capacity of the trolley body, and prolongs the service life: the bottom frame folding and unfolding assembly can be folded or unfolded along with the side frame folding and unfolding assembly, which is easy to fold, and after folding, the overall volume is small and the storage is easy: the sunshade shed that can be raised and lowered is provided, which can protect the articles from rain, increase the functions of the trolley, and has high practicability; and the casters can be detached, which is convenient to detach and install and is conducive to reducing the storage space.

The above are only the preferred implementations of the present invention. It should be pointed out that for those skilled in the art, without departing from the technical principles of the present invention, several improvements and modifications can be made. These improvements and retouching should also be regarded as the protection scope of the present invention.

What is claimed:

1. A folding trolley, comprising:
   a bottom frame folding and unfolding assembly (1) and a front wheel assembly (2) and a rear wheel assembly (3) respectively installed at the front and rear ends of the bottom frame folding and unfolding assembly (1),
   wherein side frame folding and unfolding assemblies (4) are provided on both sides of the bottom frame folding and unfolding assembly (1), the bottom frame folding and unfolding assembly (1) can be unfolded or folded through the side frame folding and unfolding assembly (4); and
   one end of the side frame folding and unfolding assembly (4) is connected with the front wheel assembly (2), a middle part of the side frame folding and unfolding assembly is connected with the bottom frame folding and unfolding assembly (1), and the other end of the side frame folding and unfolding assembly is connected with the rear wheel assembly (3);
   wherein the bottom frame folding and unfolding assembly (1) comprises a first X-shaped frame (11) and a second X-shaped frame (12), the first X-shaped frame (11) and the second X-shaped frame (12) are hinged through first hinged seats (13) on both sides; and one end of the first X-shaped frame (11) is hinged with the front wheel assembly (2), and one end of the second X-shaped frame (12) is hinged with the rear wheel assembly (3);
   wherein the first X-shaped frame (11) and the second X-shaped frame (12) have the same structure, each comprise a second hinged seat (14) in a middle part and four supporting rods (15) hinged to the second hinged seat (14), and two adjacent hinged rods (15) are vertically provided;
   wherein the second hinged seat (14) is cross-shaped, the supporting rods (15) are rotatable downward relative to the second hinged seat (14), and the supporting rods (15) are rotatable upward relative to the first hinged seat (13);
   wherein the side frame folding and unfolding assembly (4) comprises a first folding rod (41) and a second folding rod (42) hinged with the first hinged seat (13) respectively, one end of the first folding rod (41) is connected with the front wheel assembly (2), and one end of the second folding rod (42) is connected with the rear wheel assembly (3);
   wherein the side frame folding and unfolding assembly (4) further comprises a third folding rod (43) and a fourth folding rod (44) whose end portions are hinged to each other, and one end of the third folding rod (43) is hinged with the front wheel assembly (2), a middle part of the third folding rod is hinged with the first folding rod (41); and one end of the fourth folding rod (44) is hinged with the rear wheel assembly (3), and the middle part of the fourth folding rod is hinged with the second folding rod (42); and
   wherein the front wheel assembly (2) and the rear wheel assembly (3) have the same structure, each comprise telescopic rods (21) provided symmetrically and a third X-shaped frame (22) installed between the two telescopic rods (21), a third hinged seat (23) is slidably installed on the telescopic rod (21), and both sides of the upper end of the third X-shaped frame (22) are respectively hinged with the third hinged seat (23), one end of the first folding rod (41) or the second folding rod (42) is hinged to the third hinged seat (23).

2. The folding trolley of claim 1, wherein a fourth hinged seat (24) is fixed at the lower end of the telescopic rod (21), and casters (25) are detachably installed on the fourth hinged seat (24); and both sides of the lower end of the third X-shaped frame (22) are hinged with the fourth hinged seat (24) respectively, and one end of the third folding rod (43) or the fourth folding rod (44) is hinged to the fourth hinged seat (24).

3. The folding trolley of claim 1, wherein a sunshade shed (5) is installed between the four telescopic rods (21), and the sunshade shed (5) can be raised and lowered under the driving of the telescopic rods (21).

4. The folding trolley of claim 1, wherein a push rod assembly (6) for pushing the trolley body is installed on the rear side of the rear wheel assembly (3).

5. The folding trolley of claim 4, wherein the push rod assembly (6) comprises a fifth hinged seat (61) located between the two telescopic rods (21), and both sides of the fifth hinged seat (61) are connected to the telescopic rod (21) through a fifth folding rod (62) respectively, the upper side of the fifth hinge seat (61) is hinged with a push handle (63), and a middle part of the third X-shaped frame (22) is provided with a clamping ring (64) for clamping the push handle (63).

\* \* \* \* \*